Aug. 10, 1954     G. L. GARVIN     2,685,808
POWER TORQUE-DETERMINING DRIVER

Filed May 29, 1951     2 Sheets-Sheet 1

INVENTOR.
GEORGE L. GARVIN,
BY:
George A. Gust,
ATTORNEY.

Aug. 10, 1954    G. L. GARVIN    2,685,808
POWER TORQUE-DETERMINING DRIVER
Filed May 29, 1951    2 Sheets-Sheet 2

INVENTOR.
GEORGE L. GARVIN,
BY:
George A. Gust.
ATTORNEY.

Patented Aug. 10, 1954

2,685,808

UNITED STATES PATENT OFFICE 2,685,808

POWER TORQUE-DETERMINING DRIVER

George L. Garvin, South Bend, Ind.

Application May 29, 1951, Serial No. 228,827

10 Claims. (Cl. 81—52.4)

The present invention relates to a torque device and more particularly to a device having utility in applying a measured torque to an article.

Current mass production techniques include the operations of inserting threaded members into suitably threaded openings and in certain instances (for example, the threaded members being bolts or screws) it is necessary that the threaded members be driven in to a predetermined tightness or torque. Among the reasons for applying a measured torque are to prevent the twisting-off or breaking of the threaded members, to prevent the stripping of threads, and to limit the clamping pressure of two elements being connected together by the threaded members. Other reasons and usages are apparent to those skilled in the art.

With the above in view, it is a principal object of this invention to provide a device which can drive a threaded member into a companion opening until a measured value of torque is attained.

It is a further object to provide a torque device for threading two members together with a predetermined torque having minimum and maximum torque limits.

A further object of this invention is to provide a power torque driver having utility in reliably, efficiently and expeditiously driving a threaded stud or the like into a companion opening with a measured amount of torque.

Other objects will become apparent as the description proceeds.

Figure 1:
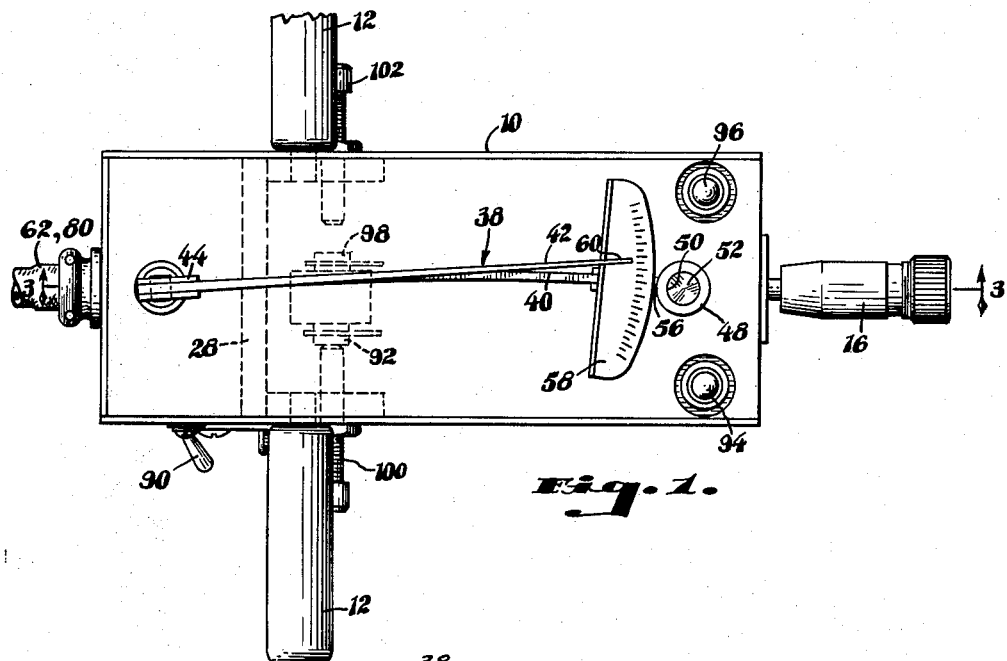
Figure 1 is a top plan view of an embodiment of the present invention.
Figure 2:
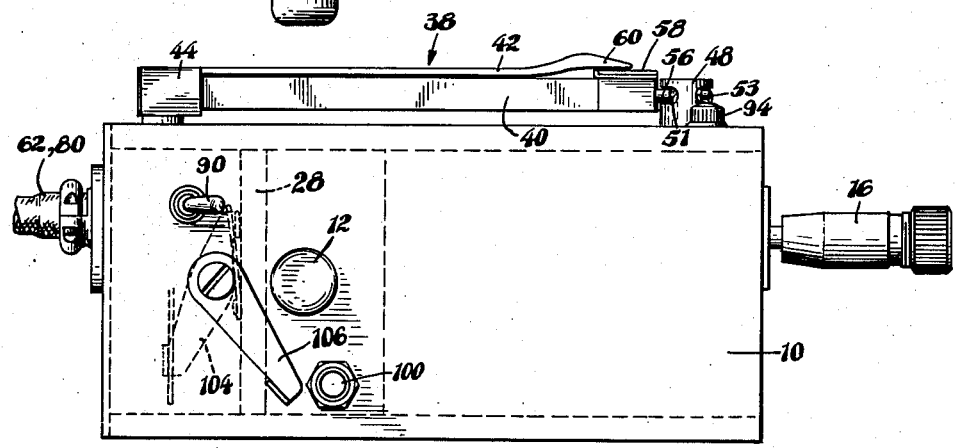
Figure 2 is a side elevation thereof.

Referring now to the drawings and more particularly to Figure 1, a rectangular housing or supporting frame enclosure 10 is provided with two oppositely and laterally extending handles 12 which may be gripped by the operator in operating this invention. Inside housing 10 is cradled an electric motor, generally indicated by reference numeral 14, similar in design to the conventional power tapping tool used to thread openings in steel or the like. This motor 14 is coupled by means of a suitable reversing transmission (not shown) to a work spindle 16 which in the illustration is of the socket wrench type used to drive nuts and headed bolts in place. By using the reversing transmission, the direction of rotation of spindle 16 is controlled by merely exerting an axial pulling or pushing force on said spindle. It will be noted that said spindle passes through the end wall of housing 10 and is journalled therein by means of a suitable bearing 18.

Fixedly secured on the end 20 of the motor casing 22 is a journal extension or trunnion 24 which extends oppositely to spindle 16 on an axis substantially coextensive therewith. This trunnion has a reduced diameter portion which is journalled in a bearing 26 suitably mounted in a transverse, rigid partition 28 in housing 10. With this journal arrangement, motor 14 may be rocked in the bearings 18, 26 a limited extent for a purpose hereinafter explained.

Positioned to the rear of partition 28 is a rockable shaft 30 journalled in housing bushings 31 and 33 and extending transversly of housing 10. A bevel gear 32 is secured to this shaft 30 and is meshed with a substantially identical gear 34 pinned to trunnion 24 so that rocking movement of motor 14 will be transmitted to the shaft 30.

Figure 3:
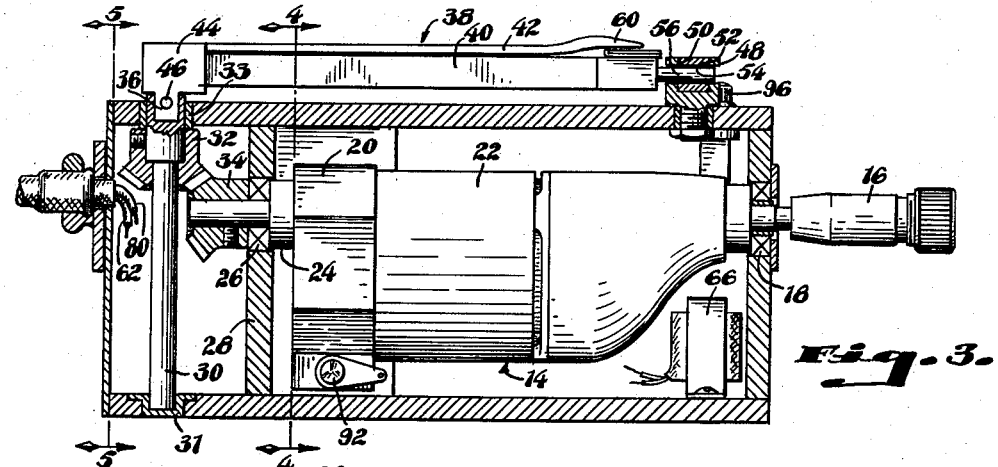
Figure 3 is a longitudinal section taken substantially on section line 3—3 of Figure 1.

As viewed more clearly in Figure 3, the upper end of shaft 30 protrudes slightly through housing 10 and is socketed to receive a tongue 36 depending from an end of a resilient torque assembly generally indicated by reference numeral 38. This assembly 38 is relatively long and of rectangular cross section and is longitudinally split into two sections: viz, a torque arm 40 and an indicator bar 42. This arm 40 and bar 42 merge in a support block 44 which carries the aforementioned tongue 36. If desired, a pin 46 may be used to join said tongue and shaft 30 together to insure that block 44 will faithfully follow the rocking action of shaft 30 and to maintain said torque assembly 38 in assembled position.

A swivel support 48 is rigidly secured to housing 10 adjacent the remaining end of torque arm 40 and is provided with a socket 50 (see Figure 3) which receives therein for rotation a cylindrical bearing 52. The wall of socket 50 is circumferentially slotted on opposite sides at 51 and 53 and bearing 52 has a diametral opening 54 in registry therewith. A cylindrical extension 56 rigid with the right-hand end of arm 40 is passed through said opening 54 and the slots 51, 53 with the circumferential extent of said slots being arranged to allow a limited pivotal movement of bearing 52 in both directions from the relaxed straight-line position of torque arm 40. A slight pivotal movement is illustrated in Figure 1. Thus, with this arrangement, a slight rotation of shaft 30 will cause torque arm 40 to bend or bow (see Figure 1) and the arm extension 56 to rotate and slide to a slight extent in the swivel support 48.

Mounted transversely and on top of arm 40 and adjacent swivel 48 is an indicator plate or scale 58 marked off in equally spaced portions representing "pound-inches" or the like of torque with the values of torque reading from a zero center portion outwardly in both directions in progressively increasing values. The right-hand end of the indicator bar 42 may be pointed as at 60 and bent to overlie the scale 58 to indicate values of torque.

Figure 4:
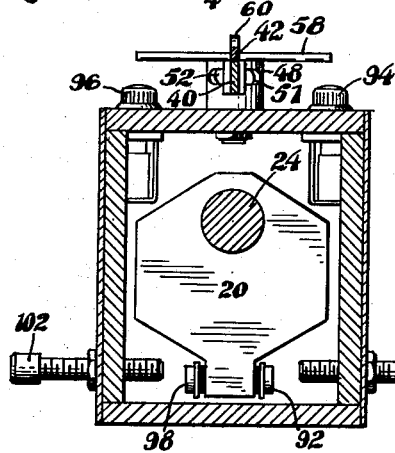
Figure 4 is a cross section taken substantially on section line 4—4 of Figure 3.
Figure 5:
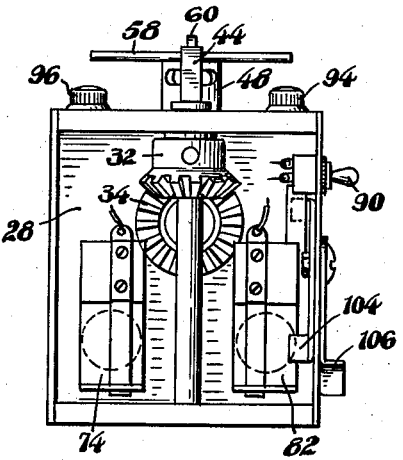
Figure 5 is a cross section taken substantially on section line 5—5 of Figure 3.

Thus far it should be obvious that by rocking the motor 14 in a counterclockwise direction a predetermined amount as viewed in Figures 4 and 5, the torque arm 40 will be bowed as in Figure 1 while the indicator arm and pointer 42, 60 will remain substantially straight and will be moved relative to scale 58 to indicate the value of torque being exerted by the arm 40. At this point it may be recognized that if the rotation of spindle 16 is resisted by a given amount of torque, an equal and opposite torque will be transmitted from motor casing 22 through rock shaft 30 and to torque arm 40, with pointer 60 indicating the value of the aforementioned given amount. The torque being delivered by spindle 16 is actually dependent upon the resistance which arm 40 has to deformation or bending.

Figure 6:
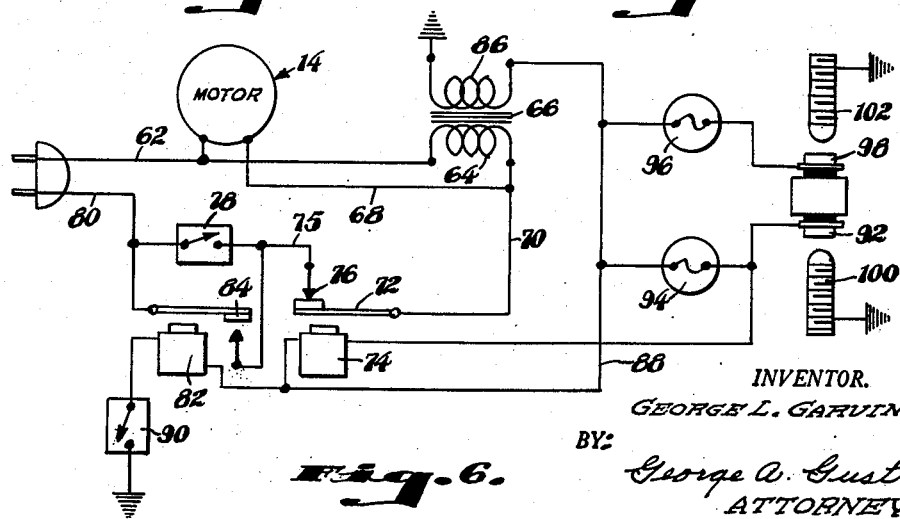
Figure 6 is a wiring diagram of the electrical circuit used in the aforementioned embodiment.

Referring now to Figure 6, the wiring diagram for controlling the operation of motor 14 and consequently the value of torque delivered by spindle 16 is shown. Generally, the arrangement of Figure 6 may be adjusted to control the application of either a minimum or a maximum torque, or a range of torques having minimum and maximum limits.

The motor 14 is of the alternating current type and has one side connected to a power lead 62. This lead 62 is connected to one end of the primary winding 64 of a step-down transformer 66 and the other end of this winding 64 is connected to the other motor lead 68. Extending from motor lead 68 is wire 70 which leads to the armature 72 of normally closed relay 74, and a wire 75 branches from contact 76 engageable with said armature 72 to a normally opened switch 78 which is connected to the remaining power line 80. A relay 82 is provided with normally open contacts 84 which are bridged across switch 78. It will be noted that the secondary winding 86 of transformer 66 is grounded on one side and has the other side connected by means of a lead 88 to one side of the coil of relay 82, the other side of this coil being grounded through a switch 90.

The coil of relay 74 is seriesed between lead 88 and a contact 92 carried by and insulated from the end 20 of motor casing 22. A red pilot lamp 94 may be shunted across this last-mentioned coil 74. Another lamp 96, preferably of a different color such as green, extends between lead 88 and a second motor contact 98 supported in similar manner to contact 92 but on an opposite part of casing end 20 (see Figure 4).

Two contact screws 100 and 102 are adjustably set in opposite sides of housing 10 in registry with contacts 92 and 98, respectively, and as seen in both Figures 4 and 6 are grounded to housing 10. As shown in Figure 5, relays 74 and 82 may be mounted on the left and right-hand portions of partition 28.

The contacts of relay 84 and switch 78 may be manually closed by means of a lever 104 secured to an operating arm 106 pivoted on the side of housing 10. By rocking arm 106 in the proper direction, contacts 84 and switch 78 are closed to establish an energizing circuit to motor 14.

For the first mode of operation (see Figure 1), consider contact screw 102 as being turned in sufficiently far to engage contact 98 and to rotate motor 14 counterclockwise (as viewed in Figure 4) an amount corresponding to a desired torque reading of pointer 60. Contact screw 100 may, of course, have to be backed out to allow for this setting and must not engage contact 92. Now by closing switch 90 and manipulating arm 106 to close switch 78 and contacts 84, an energizing circuit will be coupled to motor 14 and transformer 66. Secondary power from transformer winding 86 will pass through the coil of relay 82 holding contacts 84 in contact and thereby holding the energizing circuit to motor 14. Pilot lamp 96 will light indicating closure of contact 98 with screw 102. Assuming spindle 16 to be working on a bolt having a right-hand thread, the moment such bolt tightens down to an extent which exceeds the restoring force of the bowed torque arm 40, the motor casing 22 will be rocked in a direction to further bow arm 40 and to thereby break the engagement between contact 98 and screw 102. Lamp 96 will cease glowing indicating that the original torque setting of pointer 60 has been reached. Switch 90 is then manually opened, de-energizing relay 82 and motor 14 and readying the device for another operation.

In the operation just described, an assumption is made that the bolt is turned clockwise to tighten with the reaction from the spindle causing casing 22 to rock counterclockwise.

This first mode of operation will always produce a tightness corresponding to at least the setting of pointer 60 on scale 58.

The second mode of operation is to prevent the application of excessive torque to the bolt. For this operation, let it be assumed that the bolt is to be tightened to a maximum torque of 50 pound-inches. The first setting is to turn screw 102 in to engagement with contact 98 and to rotate casing 22 until pointer 60 reads 50 pound-inches on scale 58. Next carefully turn screw 100 in until it just engages contact 92. Now back screw 102 off until a space is provided between screw 100 and contact 92 or until screw 102 and contact 98 are completely disengaged.

Closure of switch 90 and momentary manipulation of switch arm 106 to close switch 78 and contacts 84 will as before energize motor 14 and transformer 66 (again assume that spindle 16 is being rotated clockwise). As in the first mode of operation, relay 82 will be energized to hold in the contacts 84. As the bolt is tightened down, the reactionary torque exerted on casing 22 will be transmitted to torque arm 40 which will progressively bow until pointer 60 reaches the 50 pound-inches mark. Since this degree of bow represents the original setting of screw 100, contact 92 will be grounded by engagement with screw 100 establishing a circuit through lamp 94 and the secondary winding 86 and also through the coil of relay 74. The arm 72 on relay 74 will be drawn out of engagement with contact 76 thus breaking the power circuit to both the motor 14 and transformer 66. Contacts 84 of relay 82 now open permanently stopping the motor 14. The torque at which the bolt is driven in is 50 pound-inches. Thus it is apparent that different settings of screw 100 will determine maximum torque while adjustment of screw 102 will determine minimum torque.

By the use of this invention, the unfavorable features of similar devices which utilize slipping clutches or friction drive devices for rotating the work spindle are eliminated, and entirely consistent and reliable results are achieved. In prior art friction devices, the coefficient of friction varied so widely with temperature changes which occurred during operation between the slipping parts that it was virtually impossible to attain even closely consistent results.

With the present invention, it is with reliable ease that accurate adjustments for torque may be made for values ranging from near zero to the maximum of the instrument. Other favorable attributes and uses of this invention will be apparent to those persons skilled in the art.

While only a single embodiment of this invention has been herein disclosed, it is obvious that other types of motors and control arrangements may be used without departing from the true scope of this invention. It is intended that these and other equivalent arrangements be covered by the claims appended hereto.

I claim:

1. A torque responsive device comprising a supporting frame enclosure, a motor carried inside said enclosure and having a rotatable work spindle and a nonrotatable casing, said spindle protruding beyond one end of said casing, a trunnion secured to the other end of said casing and having its axis substantially coextensive with the axis of said spindle, said trunnion and said spindle being journalled in bearing portions in said frame enclosure thus permitting said motor to be rocked relative to said enclosure, a rock shaft journalled in said enclosure adjacent the end of said trunnion and at right angles to the axis of said trunnion, meshed bevel gears secured to both said rock shaft and said trunnion to impart rocking motion from said motor casing to said shaft, a swivelable post mounted on the outside of said enclosure at a point spaced from the location of said shaft, a leaf spring element secured at one end to said shaft and having its other end slidably engaging said post whereby rocking movement of said shaft will be opposed by a corresponding flexing of said spring element, two electrical contacts which are insulated from each other mounted on opposite sides of said casing, two adjustable contact screws received in opposite sides of said frame enclosure and arranged to be engaged by respective ones of said first-named contacts, and an electrical circuit including a pilot lamp connected to said contacts in such a manner that when said motor casing is rocked sufficiently in one direction one of said contacts will engage one of said screws causing said motor to be deenergized and when rocked sufficiently in the other direction the other of said contacts will engage the other of said screws causing said lamp to be energized.

2. A torque responsive device comprising a supporting frame enclosure, a motor carried inside said enclosure and having a rotatable work spindle and a nonrotatable casing, said spindle protruding beyond one end of said casing, a trunnion secured to the other end of said casing, said trunnion and said spindle being journalled in bearing portions in said frame enclosure thus permitting said motor to be rocked relative to said enclosure, a rock shaft journalled in said enclosure adjacent the end of said trunnion and at right angles to the axis of said trunnion, means connecting both said rock shaft and said trunnion to impart rocking motion from said motor casing to said shaft, a post mounted on the outside of said enclosure at a point spaced from the location of said shaft, a leaf spring element secured at one end to said shaft and having its other end slidably engaging said post whereby rocking movement of said shaft will be opposed by a corresponding flexing of said spring element, two electrical contacts which are insulated from each other mounted on opposite sides of said motor casing, two adjustable contact screws received in opposite sides of said frame enclosure and arranged to be engaged by respective ones of said first-named contacts, and an electrical circuit including a pilot lamp connected to said contacts in such a manner that when said motor casing is rocked sufficiently in one direction one of said contacts will engage one of said screws causing said lamp to be energized.

3. A torque responsive device comprising a supporting frame enclosure, a motor carried inside said enclosure and having a rotatable work spindle and a nonrotatable casing, said spindle protuding beyond one end of said casing, a trunnion secured to the other end of said casing, said trunnion and said spindle being journalled in bearing portions in said frame enclosure thus permitting said motor to be rocked relative to said enclosure, a member pivotably supported in said enclosure, means connecting said trunnion and said pivotable member together whereby rocking movement of said motor will be correspondingly imparted to said member, a guide element affixed to said enclosure at a point spaced from the location of said pivotable member, a leaf spring element secured at one end to said pivotable member and having its other end operatively engaging said guide element whereby rocking movement of said member will be opposed by a corresponding flexing of said spring element, two electrical contacts which are insulated from each other mounted on opposite sides of said motor casing, two adjustable contact screws received in opposite sides of said frame enclosure and arranged to be engaged by respective ones of said first-named contacts, and an electrical circuit including a pilot lamp connected to said contacts in such a manner that when said motor casing is rocked sufficiently in one direction one of said contacts will engage one of said screws causing said motor to be deenergized and when rocked sufficiently in the other direction the other of said contacts will engage the other of said screws causing said lamp to be energized.

4. A torque responsive device comprising a supporting frame, a motor carried by said frame and having a rotatable work spindle and a nonrotatable casing, said spindle protruding beyond one end of said casing, a trunnion secured to the other end of said casing, said trunnion and said spindle being journalled in bearing portions in said frame thus permitting said motor to be rocked relative to said frame, a member pivotably supported by said frame, means connecting said trunnion and said pivotable member together whereby rocking movement of said motor will be correspondingly imparted to said member, a guide element affixed to said enclosure at a point spaced from the location of said pivotable member, and a leaf spring element secured at one end to said pivotable member and having its other end operatively engaging said guide element whereby rocking movement of said member will be opposed by a corresponding flexing of said spring element.

5. A torque responsive device comprising a supporting frame, a motor carried by said frame and having a rotatable work spindle and a nonrotatable casing, a journal secured to said casing, said journal and said spindle being pivotably supported by said frame whereby said motor may be rocked about the axis of said spindle, a member pivotably supported by said frame, means connecting said journal and said pivotable member together whereby rocking movement of said motor will be imparted to said member, a guide means carried by said frame at a point spaced from said pivotable member, a leaf spring element secured at one end to said pivotable member and having its other end operatively engaging said guide means whereby rocking movement of said pivotable member will be opposed by a corresponding flexing of said spring element, at least one electrical contact arranged on said casing, a contact member supported by said frame and positioned for engagement with said contact, and an electrical circuit connected to said contact and said contact member in such a manner that when said motor casing is rocked sufficiently in a predetermined direction said contact and said contact member will be engaged thereby preventing said motor from producing torque.

6. A torque responsive device comprising a supporting frame, a motor carried by said frame and having a rotatable work spindle and a nonrotatable casing, a journal secured to said casing, said journal and said spindle being pivotably supported by said frame whereby said motor may be rocked about the axis of said spindle, a member pivotably supported by said frame, means connecting said journal and said pivotable member together whereby rocking movement of said motor will be imparted to said member, a guide means carried by said frame at a point spaced from said pivotable member, and a leaf spring element secured at one end to said pivotable member and operatively engaging said guide means whereby rocking movement of said pivotable member will be opposed by a corresponding flexing of said spring element.

7. A torque responsive device comprising a supporting frame, a motor carried by said frame and having a rotatable work spindle and a nonrotatable casing, a journal secured to said casing, said journal and said spindle being pivotably supported by said frame whereby said motor may be rocked about the axis of said spindle, a member pivotably supported by said frame, means connecting said journal and said pivotable member together whereby rocking movement of said motor will be imparted to said member, spring means operatively connected to said pivotable member and arranged to be forceably deformed when said casing is rocked from a predetermined position, at least one electrical contact arranged on said casing, a contact member supported by said frame and positioned for engagement with said contact, and an electrical circuit connected to said contact and said contact member in such a manner that when said motor casing is rocked sufficiently in a predetermined direction said contact and said contact member will be engaged thereby preventing said motor from producing torque.

8. A torque responsive device comprising a supporting frame, a motor carried by said frame and having a rotatable work spindle and a nonrotatable casing, a journal secured to said casing, said journal and said spindle being pivotably supported by said frame whereby said motor may be rocked about the axis of said spindle, a member pivotably supported by said frame, means connecting said journal and said pivotable member together whereby rocking movement of said motor will be imparted to said member, spring means operatively connected to said pivotable member and arranged to be forceably deformed when said casing is rocked from a predetermined position, and an actuating system operatively connected to said motor for actuating same and for removing such actuation when said casing has been rotated in a given direction a predetermined distance.

9. A torque responsive device comprising a first supporting member, a second supporting member rockingly carried by said first member, a third member rotatable with respect to said second member and arranged to impart its rotational reactionary force to said second member, means interposed between said first and second members in such a manner that rocking movement of said second member with respect to said first member from a predetermined position will be yieldably forcefully opposed, and means for controlling rotation of said third member and to prevent such rotation after said second member has rotated a predetermined distance in a given direction.

10. A torque responsive device comprising a supporting frame, a motor carried by said frame and having first and second relatively movable torque reaction members, the first of said members being rockably mounted in said frame, yieldable torque-determining means operatively connected to said first member and arranged to oppose rocking movement of said first member, and control means dominating the energization of said motor and arranged to cause de-energization of said motor in response to a predetermined load imposed upon said torque-determining means by the aforementioned movement of said first member.

References Cited in the file of this patent

UNITED STATES PATENTS

| Number | Name | Date |
|---|---|---|
| 1,479,178 | Harvey | Jan. 1, 1924 |
| 1,970,179 | Miller | Aug. 14, 1934 |
| 1,985,916 | Coates et al. | Jan. 1, 1935 |
| 2,394,386 | Husband | Feb. 5, 1946 |
| 2,474,247 | Hatton | June 28, 1949 |
| 2,537,997 | Hatton | Jan. 16, 1951 |

FOREIGN PATENTS

| Number | Country | Date |
|---|---|---|
| 605,512 | Germany | Nov. 14, 1934 |